Patented Dec. 13, 1932

1,891,055

UNITED STATES PATENT OFFICE

WALTER REPPE AND ULRICH HOFFMANN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF SATURATED FATTY ACID NITRILES

No Drawing. Application filed October 27, 1931, Serial No. 571,465, and in Germany November 20, 1930.

The present invention relates to the production of saturated fatty acid nitriles.

It is already known that saturated nitriles can be reduced to the corresponding amines in the presence of highly active hydrogenation catalysts, such as nickel or copper (Sabatier and Senderens, Compt. rend. 140 (1905) page 482; Bulletin, Paris (3), 33 (1905 page 371).

We have now found contrary to expectation that the hydrogenation of unsaturated nitriles to the corresponding saturated nitriles can be effected in good yields by employing catalysts consisting wholly or mainly of copper and working under mild conditions i. e. with the employment of a practically non-active or non-active catalyst or by bringing larger quantities of nitrile into contact with an active catalyst than are converted into saturated amines by the quantity of hydrogen present or by employing mixtures of hydrogen with inert gases. The double linkages of the unsaturated nitriles are completely hydrogenated by the employment of copper catalysts while the formation of appreciable amounts of amines may be avoided and the pronounced tendency of the unsaturated nitriles to form polymerization products is entirely suppressed. The temperatures of working are generally between about 50° and 500° C., a temperature between 50° and 200° C. being preferably employed on working at superatmospheric pressure and a temperature between 100° and 400° C. being preferably employed on working at atmospheric or lower pressures.

When employing highly active copper catalysts under energetic reaction conditions, the corresponding saturated amines are first formed from the unsaturated nitriles, but the activity of the catalysts declines after a short period of time. Then, contrary to expectation, these catalysts which have become of no use for reducing the nitrile groups are eminently suitable for the hydrogenation of double linkages and do not lose this property even after use for long periods of time. It is also possible, and especially advantageous industrially, to suppress the formation of amines from the start by diminishing the activity of the copper catalysts, as for example by employing catalysts having surfaces which are not very large. Thus generally speaking copper catalysts which are only weakly pyrophoric or not at all, are better suited for carrying out the selective hydrogenation of unsaturated nitriles from the start than those which are strongly pyrophoric. Even when employing very active copper catalysts such as pyrophoric copper, copper prepared by reducing compounds thereof with hydrogen at particularly low temperatures as for example from 160° to 180° C., or small quantities of copper deposited on large quantities of large surface carriers, it is possible, however, to suppress the formation of amines at the commencement of the reaction down to a subordinate degree by selecting appropriate working conditions, as for example by reducing the temperature of working by from about 20° to about 30° C., and/or, diluting the hydrogen by inert gaseous diluents, nitrogen, carbon dioxide or methane and like inert gases, or when working in the gaseous phase, by strongly loading the catalyst, i. e. by leading large amounts of nitrile vapour over the catalyst.

The catalysts can be obtained by the reduction of copper compounds, as for example the carbonate, oxide, hydroxide or nitrate of copper or complex cuprammonium salt. Natural copper ores, as for example malachite, may also be used as initial materials because a content of other metals such as iron, cobalt and the like or of difficultly reducible oxides or compounds, as for example zinc oxide, chromium oxide, zirconium oxide, calcium carbonate, barium phosphate and the like have no injurious effect. The copper catalysts may be deposited on inert carriers, as for example pumice stone, fuller's earth or active carbon, provided the conditions of working are rather mild as described above. The reduction of the copper compounds can be carried out with hydrogen or carbon monoxide or gas mixtures containing the same. Highly efficient catalysts are obtained when the reduction is carried out slowly, for example with mixtures of hydrogen rich in carbon dioxide, and at temperatures as low as possible. At higher temperatures and on working with gaseous mixtures rich in hydrogen local superheating may occur whereby the copper sinters and becomes less efficient and pyrophoric. By the selection of carriers and binding agents the activity of the catalysts may be considerably influenced, a catalyst from copper, waterglass and pumice being often less efficient than a catalyst from copper, silicic acid and pumice or a catalyst from copper, silicic acid and silica gel.

The hydrogenation may be carried out continuously or discontinuously, at atmospheric, reduced or increased pressure, such as at 5, 10, 20, 30, 50, 100, 200 or even 500 or more atmospheres, and in the liquid or gaseous phase. Solvents or diluents, as for example esters, ethers, alcohols, nitriles or aliphatic or aromatic hydrocarbons, methyl formate, ethyl, butyl and amyl acetates, ethyl and butyl propionates, diethyl ether, dibutyl ether and ethyl butyl ether, any aliphatic mono- or polyhydric alcohols which are liquid at the temperatures of working, such as ethyl, propyl, butyl, amyl, decyl, octodecyl and like monohydric alcohols, glycols, glycol ethers and glycerine, saturated nitriles, as are obtained by the present process, and benzene, toluene, xylene, petroleum fractions, such as gasoline, hexane, heptane and even paraffin oil, cyclohexane and like hydrocarbons, may also be added. For example it is advantageous, when the saturated nitriles obtained by the hydrogenation are to be worked up into esters, to employ as a diluent the alcohol desired for the formation of the ester and after the hydrogenation and separation of the catalyst, directly to saponify and esterify the reaction mixture, as for example by the addition of dilute sulphuric acid or phosphoric acid, thus avoiding a distillation of the saturated nitrile. By adding water or water vapour to the reaction mixture, the corresponding acid amides or ammonium salts may be prepared by the usual methods according to the amount of water added. Pure hydrogen or hydrogen diluted with gases free from catalyst poisons may be employed, as for example hydrogen diluted with methane or nitrogen. When working under pressure on a large scale it is advantageous to introduce the unsaturated nitriles, slowly into a pressure-tight vessel at the rate at which the hydrogenation is proceeding in order to avoid any condensation or polymerization of the unsaturated nitriles.

The process according to the present invention allows of easily obtaining nitriles of acids difficultly accessible by other methods, and of then preparing difficultly accessible acids, as for example propionic acid, from the nitriles.

The following examples will further illustrate how the present invention may be carried out in practice but the invention is not restricted to these examples. The parts are by weight, unless otherwise specified.

Example 1

380 parts of crystalline copper nitrate are dissolved in 1000 parts of water and a solution of 14 parts of crystalline secondary sodium phosphate and of 450 parts of crystalline sodium carbonate in 2000 parts of water is added. The precipitate obtained is freed from sodium nitrate by decantation and filtration, and the paste is applied to 350 parts of granulated pumice stone by means of 100 parts of a 50 per cent aqueous solution of waterglass. The catalyst is carefully reduced in a current of hydrogen at a temperature rising to 260° C. and then contains about 100 grams of water glass and 100 grams of copper with a little copper phosphate per litre of pumice stone.

1000 parts by volume of hydrogen with which are mixed 20 parts by volume of acrylic nitrile vapours are led per hour at 200° C. over 5 parts by volume of the said catalyst. At first a little propylamine and higher condensation products are obtained in addition to propionitrile, but after a short time propionitrile alone is obtained.

Example 2

946 parts of a crude 92 per cent acrylic nitrile, as can be obtained by the dehydration of ethylene cyanhydrin by passing the latter at about 280° C. over bauxite, are heated in an autoclave together with 1130 parts of butanol at a temperature of 120° C., while forcing a gas mixture containing 98 per cent of hydrogen into the autoclave under a pressure of 30 atmospheres. As the catalyst 19 parts of copper are employed which have been obtained by reducing copper carbonate in a current of hydrogen at a temperature rising to 200° C. The yields are 91 per cent of the theoretical yield of propionic nitrile and 2 per cent of propionic amide. The solution separated from the catalyst may be saponified and esterified by heating with 1100 parts of 73 per cent sulphuric acid to about 100° C. to form butyl propionate in very good yields.

Example 3

100 parts of crotonic nitrile are heated to 130° C. at a pressure, of hydrogen, of 30 atmospheres without the addition of solvents and with an addition of 6 parts of a copper catalyst, obtained by treating 40 parts of copper carbonate deposited on 60 parts of fuller's earth with a current of hydrogen while raising the temperature slowly to 260° C. and which has already been used several times for the reduction of crotonic nitrile to butyric nitrile. The yield of butyric nitrile is practically 90 per cent of the theoretical yield.

Example 4

20 parts of oleic nitrile having a boiling point of 196° C. at 10 millimeters of mercury are dissolved in 300 parts of anhydrous ethyl ether whereupon the whole is heated in an autoclave at 130° C. in the presence of 1 part of the catalyst described in Example 2 and while forcing in hydrogen at a pressure of 50 atmospheres. After 3 hours the reaction mixture is worked up by filtering off the catalyst and removing the ether. Stearic nitrile is obtained in a good yield.

Example 5

8 parts of fumaric nitrile having a melting point of 96.5° C. are mixed with 100 parts of anhydrous ethyl ether and 1 part of the catalyst described in Example 2. The whole is then heated in an autoclave for 6 hours at 140° C. and at a pressure of hydrogen of 20 atmospheres. After cooling, the catalyst is filtered off and the ether is evaporated whereby succinic nitrile having a melting point of from 50° to 51° C. is obtained.

What we claim is:—

1. The process for the production of saturated fatty acid nitriles which comprises acting with hydrogen on an unsaturated fatty acid nitrile in the presence of a hydrogenation catalyst essentially containing copper, under mild conditions of working.

2. The process for the production of saturated fatty acid nitriles which comprises acting with hydrogen on an unsaturated fatty acid nitrile in the presence of a hydrogenation catalyst essentially containing practically non-pyrophoric copper, at a temperature between 50° and 500° C.

3. The process for the production of saturated fatty acid nitriles which comprises acting with hydrogen on an unsaturated fatty acid nitrile in the presence of a hydrogenation catalyst essentially containing copper and of an inert diluent at a temperature between 50° and 500° C.

4. The process for the production of saturated fatty acid nitriles which comprises acting with a mixture of hydrogen and an inert gaseous diluent on an unsaturated fatty acid nitrile in the presence of a hydrogenation catalyst essentially containing copper, at a temperature between 50° and 500° C.

5. The process for the production of saturated fatty acid nitriles which comprises contacting a mixture of hydrogen and vapours of an unsaturated fatty acid nitrile at a temperature between 50° and 500° C. with a hydrogenation catalyst essentially containing practically non-pyrophoric copper.

6. The process for the production of saturated fatty acid nitriles which comprises contacting a mixture of hydrogen and vapours of an unsaturated fatty acid nitrile at a temperature between 50° and 200° C. with a hydrogenation catalyst essentially containing copper at superatmospheric pressure.

7. The process for the production of saturated fatty acid nitriles which comprises contacting a mixture of hydrogen and vapours of an unsaturated fatty acid nitrile at a temperature between 50° and 200° C. with a hydrogenation catalyst essentially containing copper, at a pressure between 5 and 200 atmospheres.

8. The process for the production of saturated fatty acid nitriles which comprises acting with hydrogen on a liquid unsaturated fatty acid nitrile in the presence of a hydrogenation catalyst essentially containing copper and of an organic liquid, inert diluent at a temperature between 50° and 200° C. and at a pressure between 5 and 200 atmospheres.

9. The process for the production of saturated fatty acid nitriles which comprises acting with hydrogen on acrylic nitrile in the presence of a hydrogenation catalyst essentially containing copper at a temperature between 50° and 500° C. under mild conditions of working.

10. The process for the production of saturated fatty acid nitriles which comprises acting with hydrogen on acrylic nitrile in the presence of a hydrogenation catalyst essentially containing copper and of an aliphatic alcohol at a temperature between 50° and 200° C. and at a pressure between 5 and 100 atmospheres.

In testimony whereof we have hereunto set our hands.

WALTER REPPE.
ULRICH HOFFMANN.